United States Patent
Hsien et al.

(10) Patent No.: US 7,182,873 B2
(45) Date of Patent: Feb. 27, 2007

(54) METHOD OF FLUORIDE-CONTAINING WASTEWATER TREATMENT

(75) Inventors: Chen-Hung Hsien, Miao-Li Hsien (TW); Wen-Ta Huang, Miao-Li Hsien (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 344 days.

(21) Appl. No.: 10/710,402

(22) Filed: Jul. 8, 2004

(65) Prior Publication Data

US 2006/0006115 A1 Jan. 12, 2006

(51) Int. Cl.
*C02F 1/56* (2006.01)
*C02F 1/58* (2006.01)
*C02F 101/14* (2006.01)

(52) U.S. Cl. ............ 210/709; 210/725; 210/727; 210/738; 210/915; 423/497; 436/125

(58) Field of Classification Search ............ 210/915
See application file for complete search history.

(56) References Cited

U.S. PATENT DOCUMENTS 6,572,771 B2 * 6/2003 Yamasaki et al. ........... 210/605
6,613,230 B2 * 9/2003 Krulik et al. ............... 210/638
6,645,385 B2 * 11/2003 Krulik et al. ............... 210/709
6,652,758 B2 * 11/2003 Krulik ....................... 210/721

* cited by examiner

*Primary Examiner*—Peter A. Hruskoci
(74) *Attorney, Agent, or Firm*—Winston Hsu

(57) ABSTRACT

First, a primary fluoric ion concentration detection process is performed, and a primary calcium salt addition process is performed to add calcium salt in a first reaction tank, wherein the dosage of the calcium salt in the primary calcium salt addition process is determined according to the detected fluoric ion concentration. Thereupon, a secondary calcium salt addition process is performed to add calcium salt into the second reaction tank. Following that, a solid-liquid separation process is performed to separate calcium fluoride from the wastewater, and a secondary fluoric ion concentration detection process is performed upon the wastewater after the calcium fluoride is separated. Finally, the dosage of the calcium salt in the secondary calcium salt addition process is determined in a feed back control manner according to the detected fluoric ion concentration.

7 Claims, 4 Drawing Sheets

METHOD OF FLUORIDE-CONTAINING WASTEWATER TREATMENT

BACKGROUND OF INVENTION

1. Field of the Invention

The present invention relates to a method of wastewater treatment, and more particularly, to a method of fluoride-containing wastewater treatment.

2. Description of the Prior Art

Fluoride compounds have been broadly employed in many industries. In the dry etching process or the chemical vapor deposition process of semiconductor manufacturing, for example, a great amount of fluoric acid (HF) or ammonium fluoride ($NH_4F$) is used. Consequently, a large quantity of fluoride-containing wastewater is generated. The fluoride-containing wastewater has to be processed for reducing the concentration of fluoride so as to prevent environmental pollution and to recycle fluoride.

Among various methods of fluoride-containing wastewater treatment, a calcium salt precipitation method is mostly used for its advantages of low cost, operation convenience, and short reaction time. The calcium salt precipitation method is implemented by adding a fixed amount of calcium salt, which reacts with fluoric ions in the wastewater, to form calcium fluoride precipitate as the following reaction shows.

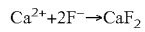

Then a solid-liquid separation process is performed to separate calcium fluoride from the wastewater so that the concentration of fluoride is reduced and the fluoride compound is recycled.

Please refer to FIG. 1 and FIG. 2. FIG. 1 is a schematic diagram of a conventional fluoride-containing wastewater treatment system 10, and FIG. 2 is a flow chart illustrating the operation procedure of the fluoride-containing wastewater treatment system 10 shown in FIG. 1. As shown in FIG. 1 and FIG. 2, the fluoride-containing wastewater generated in the factory is temporarily reserved in a storage tank (not shown). When the wastewater is accumulated to a certain amount, the fluoride-containing wastewater is introduced to a neutralization tank 12 to perform a neutralization process 52. The neutralization tank 12 has a PH meter to measure PH value, so that the fluoride-containing wastewater can be maintained in a neutral condition by adding sodium hydroxide or hydrochloride.

The fluoride-containing wastewater is then delivered to a first reaction tank 14 to perform a primary calcium chloride addition process 54. When the primary calcium chloride addition process 54 is accomplished, the wastewater is then delivered to a second reaction tank 16 to perform a secondary calcium chloride addition process 56 so that the calcium ions of calcium chloride react with the fluoric ions of the wastewater and form calcium fluoride. The calcium fluoride and the wastewater are then delivered to a rapid mixing tank 18, a slow mixing tank 22, a settling tank 24, and a concentration tank 26 therein the calcium fluoride is separated from the wastewater by performing a solid-liquid separation process, such as adding agglutinators or flocculants. After that, the wastewater is able to meet the wastewater discharge standard, and a draining process 62 is performed to discharge the wastewater.

Generally speaking, the primary calcium chloride addition process 54 performed in the first reaction tank 14 is a preliminary reaction which works to remove approximately 70% to 90% of fluoric ions. Therefore, the dosage of calcium chloride is determined quantitatively by experimental data. In other words, the dosage of calcium chloride is fixed. On the other hand, the secondary calcium chloride addition process 56 performed in the second reaction tank 16 is dynamic. This means a feed back control 60 is used to dynamically adjust the dosage of calcium chloride in the secondary calcium chloride addition process 56 according to the result of a fluoric ion detection process 58 which detects the concentration of fluoric ions in the settling tank 24. For example, if the concentration of the fluoric ions detected in the settling tank 24 is excessive, the dosage of calcium chloride in the secondary calcium chloride addition process 56 is accordingly increased to reduce the concentration of the fluoric ions in the wastewater.

It is to be noted that the wastewater contains not only the fluoride, but also considerable sulfuric acid ($H_2SO_4$), nitric acid ($HNO_3$), and phosphoric acid ($H_3PO_4$), therefore calcium sulfate ($CaSO_4$), calcium nitrate ($Ca(NO_3)_2$), and calcium phosphate ($Ca_3(PO_4)_2$) are also formed as well as calcium fluoride precipitate when calcium chloride is added into the wastewater. This leads to waste of calcium chloride. In addition, the concentration of fluoric ions is not stable. For example, if the concentration of fluoric ions changes dramatically, such as a transient high value appearing, the secondary calcium chloride addition process 56 will fail to control the concentration immediately. This makes the discharged wastewater have a high fluoric ion concentration, and thus causes environmental pollution.

SUMMARY OF INVENTION

It is therefore a primary object of the present invention to provide a method of fluoride-containing wastewater treatment for solving the aforementioned problems.

According to a preferred embodiment of the present invention, a method of fluoride-containing wastewater treatment is provided. First, a primary fluoric ion concentration detection process upon the wastewater is performed. The wastewater is then introduced into a first reaction tank, and a primary calcium salt addition process is performed to add calcium salt into the first reaction tank so that fluoric ions contained in the wastewater react with the calcium salt and form calcium fluoride, wherein the dosage of the calcium salt in the primary calcium salt addition process is determined according to a fluoric ion concentration detected in the primary fluoric ion concentration detection process. The wastewater and the calcium fluoride are thereinafter delivered into a second reaction tank, and a secondary calcium salt addition process is performed to add calcium salt into the second reaction tank so that the fluoric ions remaining in the wastewater react with the calcium salt and from calcium fluoride. Following that, a solid-liquid separation process is performed to separate the calcium fluoride from the wastewater, and a secondary fluoric ion concentration detection process is performed upon the wastewater after the calcium fluoride is separated. Finally, the dosage of the calcium salt in the secondary calcium salt addition process is determined in a feed back control manner according to a fluoric ion concentration detected in the secondary fluoric ion concentration detection process.

Since the dosage of the calcium salt in the primary calcium salt addition process is determined in a feed forward control way according to the fluoric ion concentration detected in the primary fluoric ion concentration detection process, the dosage of the calcium salt is economized. In addition, the dosage of the calcium salt in the primary calcium salt addition process is highly sensitive to the change of the fluoric ion concentration. In other words, the fluoric ion concentration can be immediately controlled even if the fluoric ion concentration has a transient high value.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
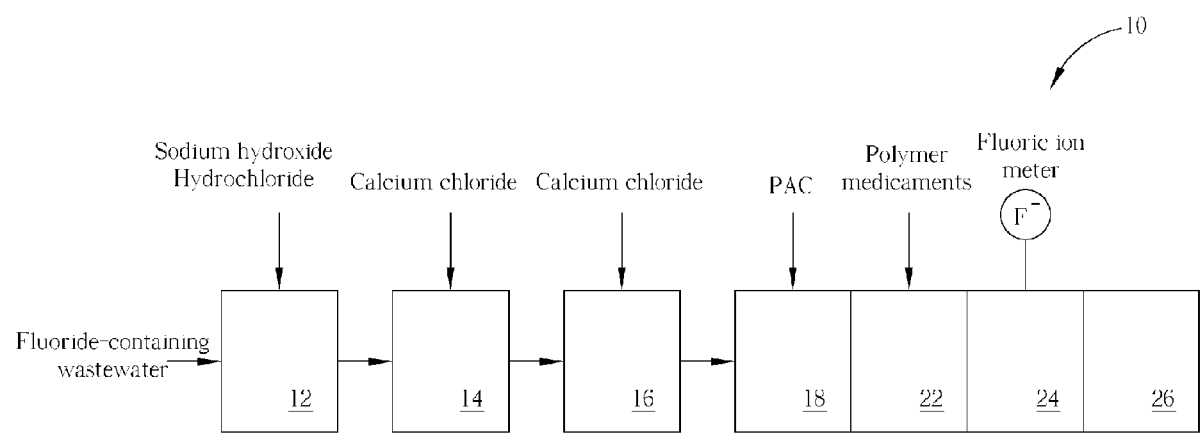
FIG. 1 is a schematic diagram of a conventional fluoride-containing wastewater treatment system.
Figure 2:
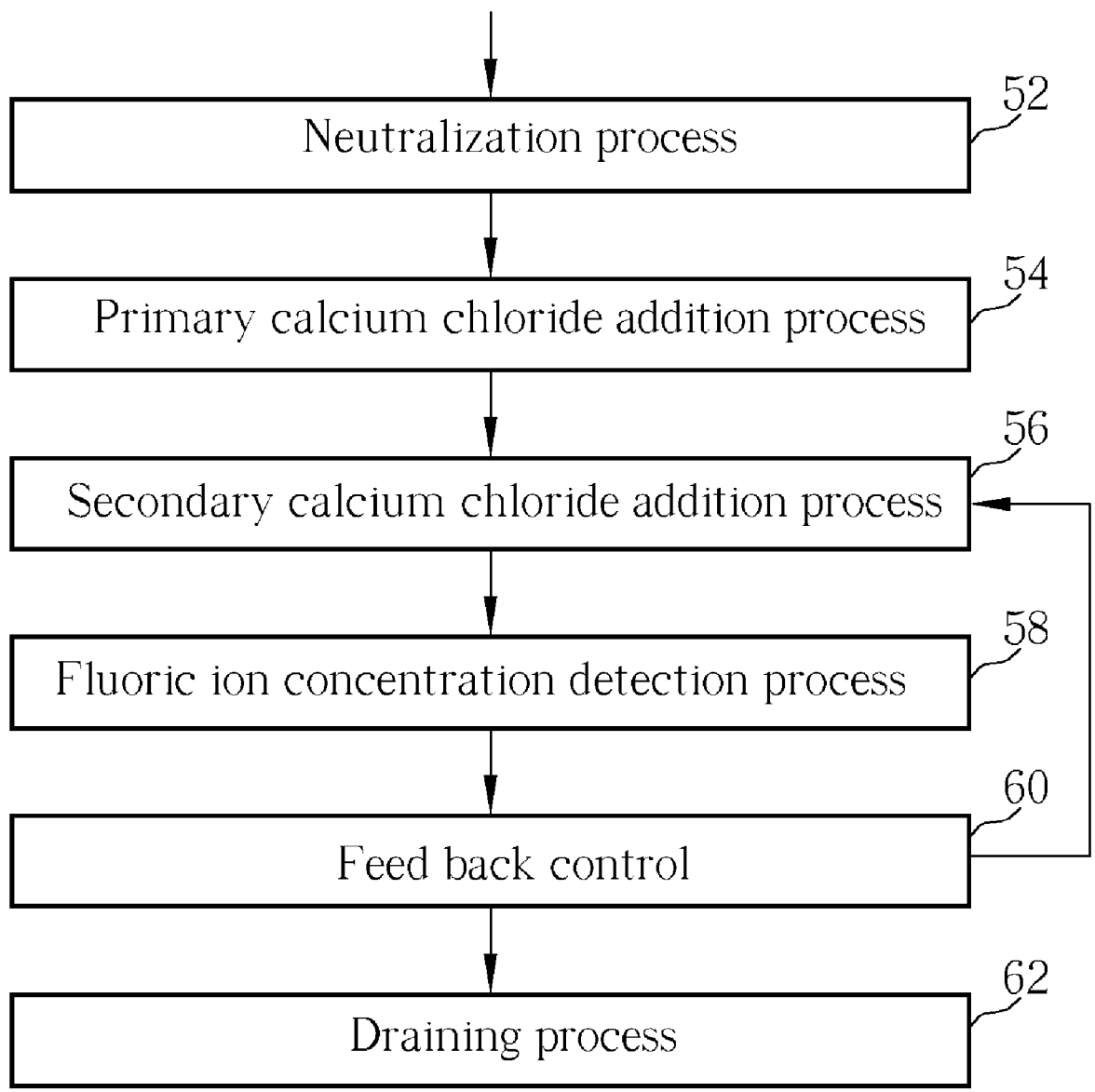
FIG. 2 is a flow chart illustrating the operation procedure of the fluoride-containing wastewater treatment system shown in FIG. 1.
Figure 3:
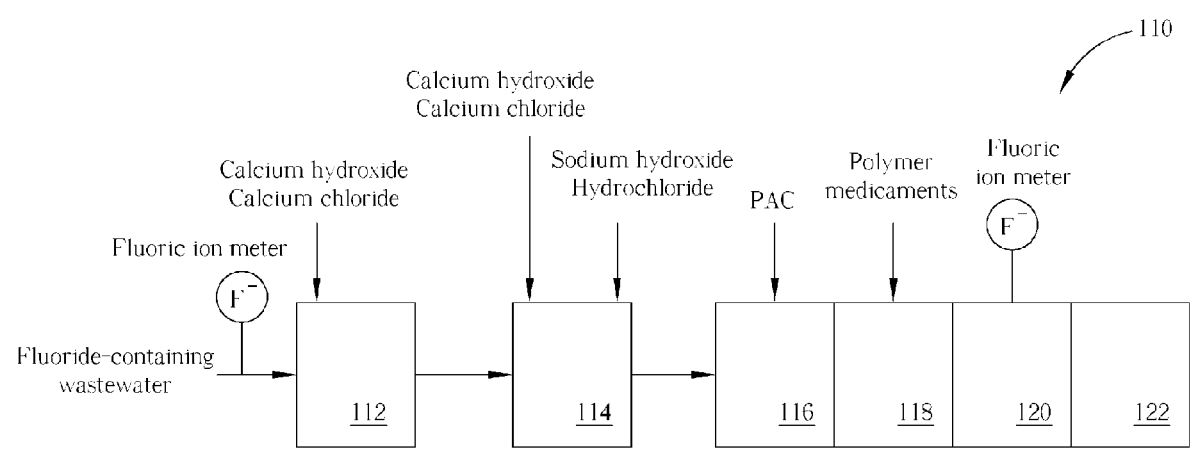
FIG. 3 is a schematic diagram of a fluoride-containing wastewater treatment system of the present invention.
Figure 4:
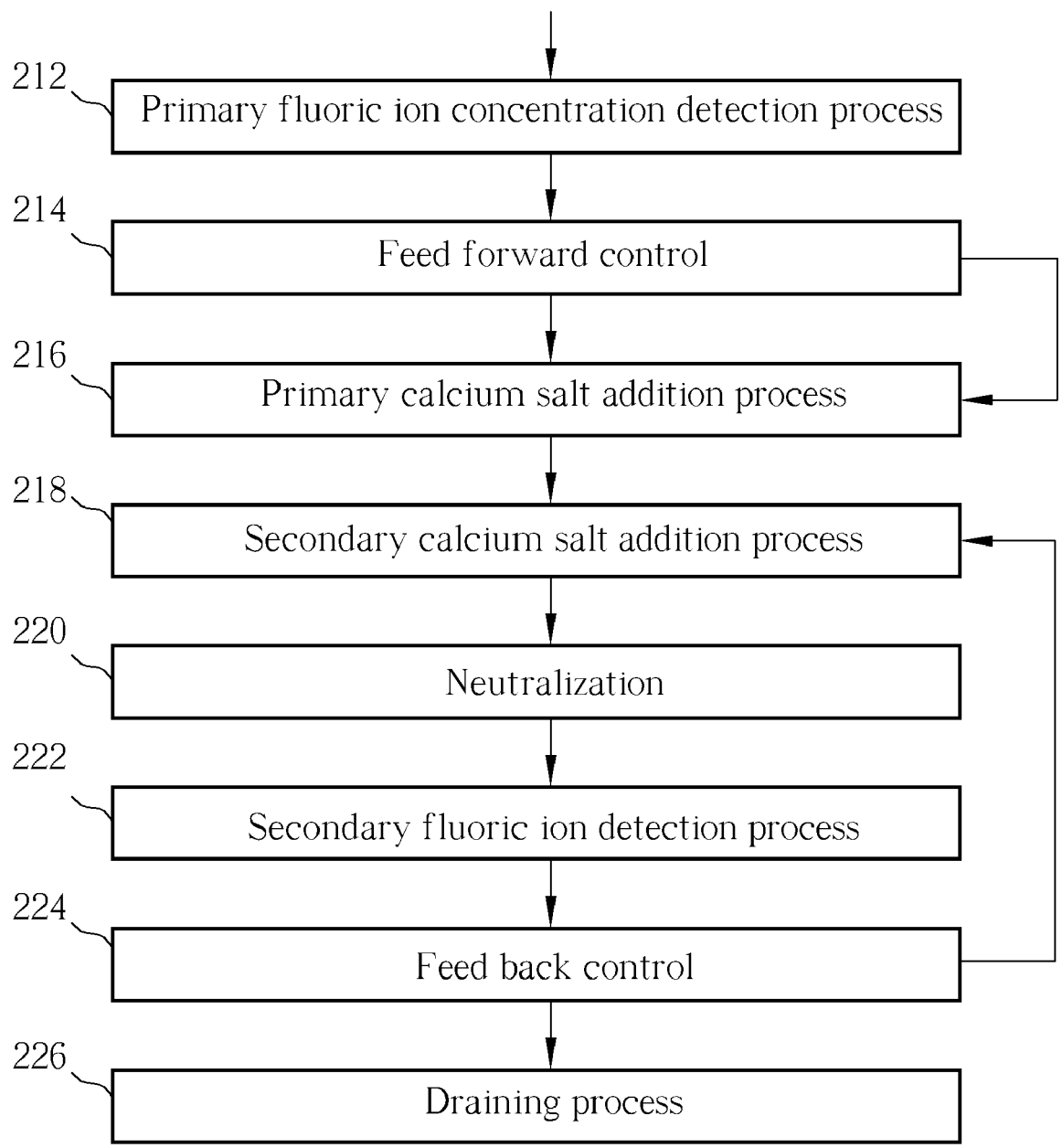
FIG. 4 is a flow chart illustrating the operation procedure of the fluoride-containing wastewater treatment system shown in FIG. 3.

Please refer to FIG. 3 and FIG. 4. FIG. 3 is a schematic diagram of a fluoride-containing wastewater treatment system 110 of the present invention, and FIG. 4 is a flow chart illustrating the operation procedure of the fluoride-containing wastewater treatment system 110 shown in FIG. 3. As shown in FIG. 3 and FIG. 4, the fluoride-containing wastewater generated in the factory is temporarily reserved in a storage tank (not shown). When the wastewater is accumulated to a certain amount, the fluoride-containing wastewater is introduced into the fluoride-containing wastewater treatment system 110.

Primarily, a primary fluoric ion concentration detection process 212 is performed upon the wastewater. It is noted that the fluoride-containing wastewater is mostly an acidic solution with a pH value of 2 to 3, and cannot be directly measured. Therefore, a buffer solution with a stable pH value is prepared in advance. For example, a sodium acetate buffer solution with a pH value of 5.5 prepared by mixing acetate with sodium hydroxide can be used. Then, a fixed amount of the fluoride-containing wastewater is added to the buffer solution, and the buffer solution is adjusted to a near neutral condition. The fluoric ion concentration of the buffer solution is then detected by a fluoric ion meter, and the fluoric ion concentration of the fluoride-containing wastewater can be estimated by considering the pH value differences, where the estimated fluoric ion concentration is a pH-free estimate.

In the above embodiment, the sampling of the fluoride-containing wastewater is carried out before the crude wastewater is delivered to a first reaction tank 112, and two sampling valves are installed to respectively control the sampling amounts of the fluoride-containing wastewater and the buffer solution. Accordingly, the pH value of the mixing solution of the fluoride-containing wastewater and the buffer solution is maintained in a neutral condition, and the fluoric ion meter is then utilized to detect the fluoric ion concentration.

The fluoride-containing wastewater is then delivered to a first reaction tank 112, and a feed forward control 214 is adopted to control a primary calcium salt addition process 216 to add calcium salt. The calcium ions of the calcium salt will react with the fluoric ions of the wastewater, form calcium fluoride, and therefore reduce the fluoric ions contained in the wastewater. Since the pH value of the fluoride-containing wastewater fluctuates inevitably to a certain extent, the feed forward control 214 is performed by using a PID controller to control the dosage of the calcium salt to be added according to the fluoric ion concentration detected in the primary fluoric ion concentration detection process 212. In addition, the PID controller can be set to a multi-stage control mechanism, which means the fluoric ion concentration is divided into several stages, and the proportion of increasing the dosage to be added is proportional to the stages. Accordingly, even if the amount of fluoric ions in the wastewater increases suddenly, the dosage calcium salt is dynamically adjusted. Furthermore, in this embodiment, the calcium salt is a mixture of calcium hydroxide and calcium chloride. As a result, two equivalent hydroxide ions are provided along with the calcium ions to reduce the acidity of the fluoride-containing wastewater. Also, the fluoride-containing wastewater in the first reaction tank 112 is still in an acidic condition, and thus the development of calcium sulfate, calcium nitride, and calcium phosphate is inhibited.

In the above embodiment, the primary fluoric ion concentration detection process 212 is performed before the fluoride-containing wastewater is delivered into the first reaction tank 112 for reducing the response time of the feed forward control 214. In practice, however, the primary fluoric ion concentration detection process 212 can be selectively performed in the first reaction tank 112 if the first reaction tank 112 is large enough and the fluoride-containing wastewater is well agitated in the first reaction tank 112.

The fluoride-containing wastewater and the calcium fluoride are then delivered into a second reaction tank 114 to undergo a secondary calcium salt addition process 218 to add calcium salt again. The calcium ions of the calcium salt will react with the fluoric ions in the wastewater, and thus the fluoric ion concentration is reduced. Simultaneously, a neutralization process 220 is performed in the second reaction tank 114 by adding acid or alkaline chemicals, such as sodium hydroxide or hydrochloride, so as to maintain a near neutral condition in the second reaction tank 114. In this embodiment, the calcium salt added in the secondary calcium salt addition process 218 includes calcium hydroxide and calcium chloride, which respectively provide calcium ions and hydroxide ions, and thus the concentration of fluoric ions and hydrogen ions in the wastewater is reduced.

The wastewater and the calcium fluoride are then delivered in turn to a rapid mixing tank 116, a slow mixing tank 118, a settling tank 120, and a concentration tank 122 in which the calcium fluoride is separated from the wastewater by performing a solid-liquid separation process, such as agglutination or flocculation. After that, the wastewater is able to meet the wastewater discharge standard, and a draining process 226 is performed to discharge the wastewater. In this embodiment, when the wastewater and the calcium fluoride are delivered from the second reaction tank 114 to the rapid mixing tank 116, proper amounts of flocculants (e.g. poly aluminum chloride) and the pH value is well controlled so that the calcium fluoride forms calcium fluoride flocs by the flocculation effect. The calcium fluoride flocs and the wastewater are then delivered from the rapid mixing tank 116 to the slow mixing tank 118, and polymer chemicals are added so that calcium fluoride flocs develop due to polymer cross-linking effect. The wastewater and the calcium fluoride flocs are then delivered to the settling tank 120. The calcium fluoride flocs will gradually separate from the wastewater due to different specific gravities. The calcium fluoride flocs are then concentrated in the concentration tank 122 to reduce the processing costs.

The operation procedure of the fluoride-containing wastewater treatment system 110 further includes a feed back control 224. As shown in FIG. 3 and FIG. 4, when the solid-liquid separation process is accomplished in the settling tank 120, a secondary fluoric ion concentration detection process 222 is performed upon the separated wastewater. Since the wastewater in the settling tank 120 is adjusted to a neutral condition, the fluoric ion meter can directly measure the concentration of fluoric ions without preparing any buffer solutions. The feed back control 224 is performed to dynamically adjust the dosage of calcium salt added in the secondary calcium salt addition process 218 according to the result of the secondary fluoric ion concentration detection process 222. The feed back control 224 can also be controlled by a PID controller. For example, if the fluoric ion concentration detected in the settling tank 120 is excessive, the dosage of the calcium salt added in the secondary calcium salt addition process 218 is accordingly increased. Consequently, the fluoric ion concentration in the wastewater is reduced, and can be legally discharged.

In comparison with the prior art, the method of fluoride-containing wastewater treatment according to the present invention detects the fluoric ion concentration in advance, and determines the dosage of calcium salt added in the primary calcium salt addition process in a feed forward control way according to the detection result. As a result, 30% of calcium salt is economized compared with the conventional method. In addition, since the dosage is determined according to the fluoric ion concentration of the crude wastewater, the method is able to maintain the stability of fluoric ion concentration. In other words, even if the fluoric ion concentration in the crude wastewater reaches a transient high value, the fluoric ion concentration of can be rapidly controlled. As a result, the wastewater with high fluoric ion concentration is never discharged.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of fluoride-containing wastewater treatment, comprising:

performing a primary fluoric ion concentration detection process upon wastewater, the primary fluoric ion concentration detection process comprising:

providing a buffer solution having a stable pH value;

adding a fixed amount of the wastewater into the buffer solution;

detecting a fluoric ion concentration in the buffer solution; and estimating the amount of fluoride contained in the wastewater;

introducing the wastewater into a first reaction tank, and performing a primary calcium salt addition process to add calcium salt into the first reaction tank so that fluoric ions contained in the wastewater react with the calcium salt and form calcium fluoride, a dosage of the calcium salt added in the primary calcium salt addition process being determined according to the fluoric ion concentration detected in the primary fluoric ion concentration detection process;

introducing the wastewater and the calcium fluoride into a second reaction tank, and performing a secondary calcium salt addition process to add calcium salt into the second reaction tank so that fluoric ions remaining in the wastewater react with the calcium salt and form calcium fluoride;

performing a solid-liquid separation process to separate the calcium fluoride from the wastewater;

performing a secondary fluoric ion concentration detection process upon the wastewater after the calcium fluoride is separated; and adjusting a dosage of the calcium salt added in the secondary calcium salt addition process according to a fluoric ion concentration detected in the secondary fluoric ion concentration detection process.

2. The method of claim 1, wherein the calcium salt added in the primary calcium salt addition process and in the secondary calcium salt addition process comprises calcium chloride and calcium hydroxide.

3. The method of claim 2, wherein the first reaction tank is maintained in an acidic condition.

4. The method of claim 1, further comprising performing a neutralization process after the secondary calcium salt addition process is performed.

5. The method of claim 1, wherein the solid-liquid separation process comprises:

introducing the wastewater and the calcium fluoride in the second reaction tank into a rapid mixing tank, and adding flocculants into the rapid mixing tank to form calcium fluoride flocs;

delivering the wastewater and the calcium fluoride flocs from the rapid mixing tank to a slow mixing tank, and adding polymer chemicals to develop the calcium fluoride flocs; and delivering the wastewater and the calcium fluoride flocs from the slow mixing tank to a settling tank so that the wastewater and the calcium fluoride flocs are separated due to different specific gravities.

6. The method of claim 5, wherein the flocculants comprise poly aluminum chloride (PAC).

7. The method of claim 5, further comprising performing a concentration process after the wastewater and the calcium fluoride flocs are separated.

* * * * *